United States Patent
Knoerrchen et al.

(10) Patent No.: US 9,640,342 B2
(45) Date of Patent: May 2, 2017

(54) SYSTEM COMPRISING ELECTRONICS HOUSING AND GROUNDING CONTACT ASSEMBLY

(71) Applicant: EATON ELECTRICAL IP GMBH & CO. KG, Schoenefeld (DE)

(72) Inventors: Oliver Knoerrchen, Cologne (DE); Stephan Stanke, Rheinbach (DE); Ulrike Radermacher, St. Augustin (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 0 days.

(21) Appl. No.: 15/104,272

(22) PCT Filed: Dec. 9, 2014

(86) PCT No.: PCT/EP2014/077009
§ 371 (c)(1),
(2) Date: Jun. 14, 2016

(87) PCT Pub. No.: WO2015/091098
PCT Pub. Date: Jun. 25, 2015

(65) Prior Publication Data
US 2016/0314911 A1      Oct. 27, 2016

(30) Foreign Application Priority Data
Dec. 17, 2013   (DE) .................. 10 2013 114 261

(51) Int. Cl.
*H01H 9/02*      (2006.01)
*H01R 4/48*      (2006.01)
(Continued)

(52) U.S. Cl.
CPC .............. *H01H 9/02* (2013.01); *H01R 4/4827* (2013.01); *H01R 4/64* (2013.01); *H01R 9/2691* (2013.01);
(Continued)

(58) Field of Classification Search
CPC .......... H01H 9/02; H01R 12/71; H01R 13/17; H01R 13/26; H01R 13/652; H01R 4/4827;
(Continued)

(56) References Cited

U.S. PATENT DOCUMENTS 5,853,304 A * 12/1998 Landreau ............. H01R 31/085
439/716
6,135,825 A    10/2000 Bock et al.
(Continued)

FOREIGN PATENT DOCUMENTS

DE    19727454 A1    1/1999
DE    29905625 U1    6/1999
(Continued)

*Primary Examiner* — Edwin A. Leon
(74) *Attorney, Agent, or Firm* — Leydig, Voit & Mayer, Ltd

(57) ABSTRACT

A system has an electronics housing and a grounding contact assembly for electromechanical switchgear that can be mounted on a mounting rail, wherein the grounding contact assembly can be mounted in the electronics housing. The base region of the electronics housing faces a mounting rail, is provided with an externally accessible mounting duct for a grounding contact that can be mounted in the duct, and contacts the mounting rail in a spring-leaded manner. The contact part has a blade contact at one end and at the other end a terminal receiving part which is angled perpendicularly to the first free end of the blade contact and is designed as a detent pin. The grounding contact assembly can be (Continued)

pushed into the mounting duct irrespective of the position of the electronics housing on the mounting rail.

13 Claims, 2 Drawing Sheets

(51) Int. Cl.
    *H01R 4/64*     (2006.01)
    *H01R 9/26*     (2006.01)
    *H02B 1/052*     (2006.01)
    *H01R 12/71*     (2011.01)
    *H01R 13/17*     (2006.01)
    *H01R 13/26*     (2006.01)
    *H01R 13/426*     (2006.01)
    *H01R 13/652*     (2006.01)

(52) U.S. Cl.
    CPC .............. *H01R 12/71* (2013.01); *H01R 13/17* (2013.01); *H01R 13/26* (2013.01); *H01R 13/426* (2013.01); *H01R 13/652* (2013.01); *H02B 1/052* (2013.01)

(58) Field of Classification Search
    CPC ...... H01R 4/64; H01R 9/2691; H01R 13/426; H02B 1/052
    USPC ........ 200/51 R, 554, 307, 50.32, 50.35, 304, 200/305, 293; 439/716, 532, 715, 717, 439/296, 507, 709, 711–713, 718, 417, 439/406
    See application file for complete search history.

(56) References Cited

U.S. PATENT DOCUMENTS

| | | |
|---|---|---|
| 7,922,521 B1* | 4/2011 | Wu ...................... H01R 9/2691 439/532 |
| 8,939,800 B2* | 1/2015 | Hoppmann .......... H01R 9/2675 439/513 |
| 2007/0246256 A1 | 10/2007 | Eusterholz et al. |

FOREIGN PATENT DOCUMENTS

| | | |
|---|---|---|
| DE | 10324144 A1 | 2/2005 |
| DE | 202006006615 U1 | 9/2006 |
| DE | 102006059826 A1 | 7/2008 |
| FR | 2650709 A1 | 2/1991 |

* cited by examiner

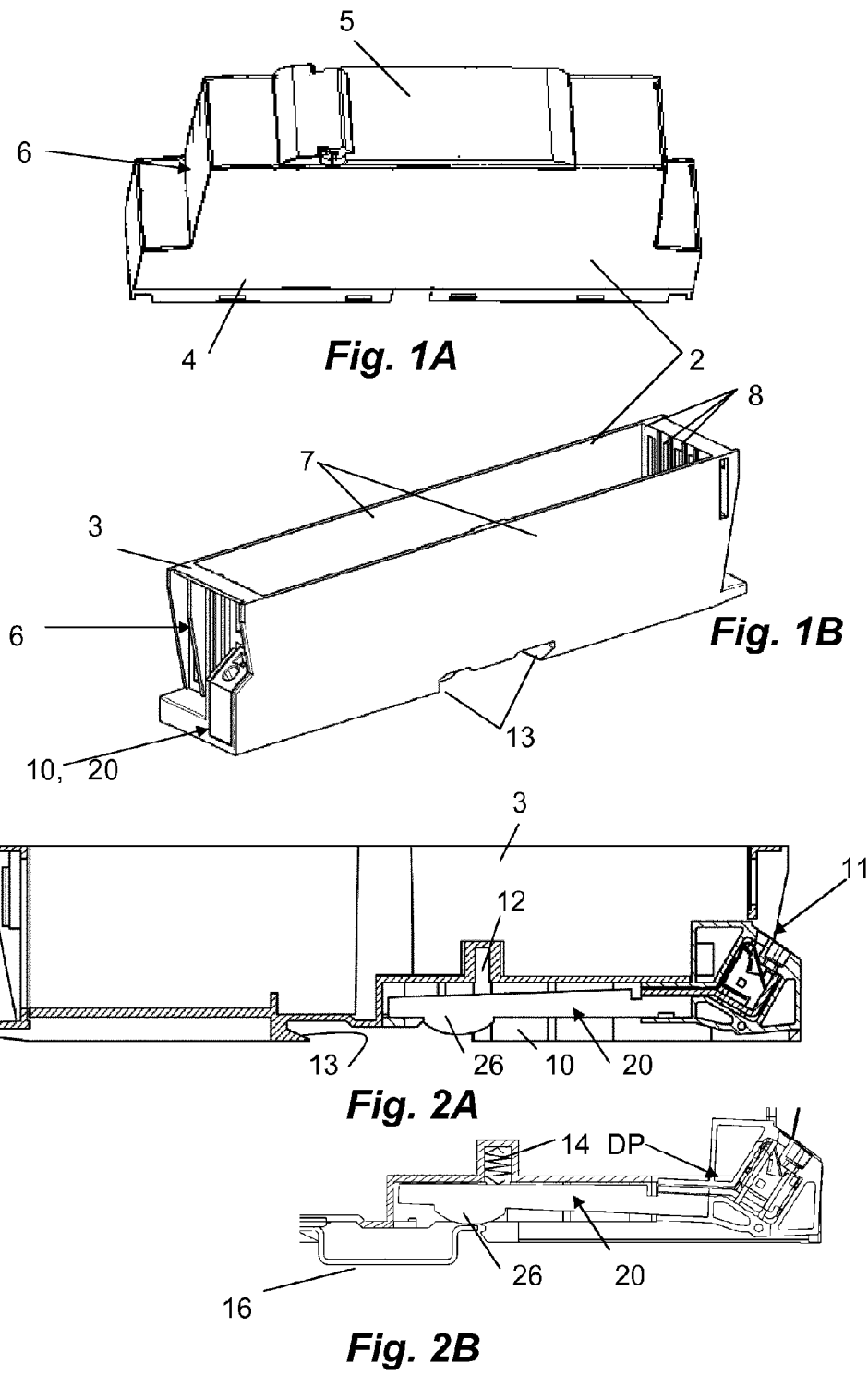

SYSTEM COMPRISING ELECTRONICS HOUSING AND GROUNDING CONTACT ASSEMBLY

CROSS-REFERENCE TO RELATED APPLICATIONS

This application is a U.S. national stage application under 35 U.S.C. §371 of International Application No. PCT/EP2014/077009, filed on Dec. 9, 2014, and claims benefit to German Patent Application No. DE 10 2013 114 261.3, filed on Dec. 17, 2013. The International Application was published in German on Jun. 25, 2015, as WO 2015/091098 A1 under PCT Article 21(2).

FIELD

The invention relates to a system comprising an electronics housing and a grounding contact arrangement for an electromechanical switching device for placing on a mounting rail, it being possible to install the grounding contact arrangement in the electronics housing.

BACKGROUND

Electronics housings of this type often consist of an upper housing part and a lower housing part that can be latched onto a mounting rail (for example in DE 202006006615 U1). In this document, the upper housing part comprises connections for electrical lines, the connections being connected to the lower housing part by means of plug contacts. The lower socket part of the electronics housing is designed to receive a plurality of printed circuit boards.

Additional arrangements of electronics housings of this kind are known, in which a protective earth conductor contact (also referred to as a PE contact) is provided in contact with the mounting rail (DE 102006059826 A1). The protective earth conductor contact is inserted into an installation duct before being placed on the electronics housing, and a contact part contacts the mounting rail. In this protective earth conductor contact, the electrical contact elements in particular are arranged outside of the housing and are prone to contamination and damage. Another disadvantage is that the contact elements are formed having relatively thin sheet thicknesses, as a result of which they are sensitive to the application of force or to damage. The protective earth conductor contact cannot be installed when the electronics housing is resting on a mounting rail.

SUMMARY

An aspect of the invention provides a system, comprising: an electronics housing for an electromechanical switching device, the electronics housing being configured so as to be placeable on a mounting rail; and a grounding contact arrangement, the grounding contact arrangement being configured to resiliently contact the mounting rail. The electronics housing includes a printed circuit board duct configured for inserting one or more printed circuit boards, connection terminals or plug-in connectors configured to connect one or more electrical conductors, the connection terminals being electrically connectable to at least one printed circuit board, and an installation duct, present in a bottom region of the electronics housing, facing the mounting rail, the installation duct being accessible from outside a narrow side of the electronics housing, the installation duct further being formed inside the electronics housing and parallel to the printed circuit board duct. The grounding contact arrangement includes a contact part formed as a blade contact, a contact terminal which can be fastened on the contact part provided with a latching pin, and a contact housing including insulating material, the contact housing being configured to receive the latching pin and the contact terminal. The installation duct is formed near to an edge of a longitudinal side of the bottom region of the electronics housing and the installation duct is enclosed by housing faces of the electronics housing. The grounding contact arrangement can be inserted into the installation duct irrespective of a position of the electronics housing on the mounting rail, and the blade contact of the contact part is configured to come to rest on the mounting rail in a resilient manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1A and 1B are an example of a two-part electronics housing,

FIGS. 2A and 2B are a section through a socket part that forms the bottom region.

DETAILED DESCRIPTION

Figure 3:
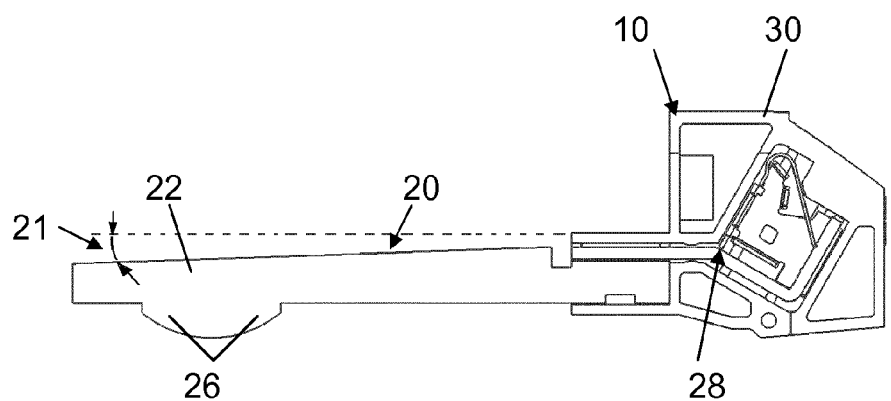
FIG. 3 is a side view of the grounding contact arrangement.

An aspect of the present invention provides a system comprising an electronics housing and a grounding contact arrangement, in which the grounding contact arrangement can be introduced into the interior of the electronics housing and mounted in an electrically safe manner.

The grounding contact arrangement according to an aspect of the invention is provided for installation in an electronics housing equipped with an installation duct according to the invention. In an electronics housing that rests on the mounting rail, the grounding contact arrangement can be inserted into the installation duct. The installation duct is accessible from the outside via an installation opening.

Electronics housings in which an installation duct is formed can be retrofitted with the grounding contact arrangement according to the invention, irrespective of the position of the grounding contact arrangement on a mounting rail. In this case, the contact of the grounding contact arrangement comes into resilient contact with the mounting rail.

One feature of the invention is that the installation duct for the grounding contact arrangement is formed in the electronics housing in the bottom region, near to the edge of the longitudinal side of the electronics housing and is enclosed by the housing faces, in particular by the side walls, of the electronics housing. Only a narrow slot that is oriented towards the mounting rail and is barely wider than the width of the blade contact is provided on the lower side in the form of an opening.

One advantage of the invention is that the grounding contact arrangement can be retrofitted in the basic device without requiring tools. When the grounding contact arrangement is placed on the mounting rail, a ground connection is automatically established by means of the metal mounting rail. The connection between the grounding contact and the mounting rail is electrically safe, since the grounding contact arrangement is countersunk in the housing.

At least one printed circuit board can be arranged in the electronics housing in parallel with the two longer external walls of the electronics housing. In order to prevent an electronics housing undesirably lifting off from the mounting rail, the bottom region or the socket part of the electronics housing can comprise a lock that is used to releasably connect the socket part, and thus the electronics housing as a whole, to the mounting rail.

Specifically, there are now several possibilities for designing and developing the proposed system comprising an electronics housing and a grounding contact arrangement. Reference is made in this regard to both the features set out in the claims and the description of preferred embodiments in conjunction with the drawings. Individual features can be combined either individually or in combination, provided that this is technically expedient.

The installation duct can be relatively narrow, preferably having a width of at most a third of the narrow side of the electronics housing. The installation duct has an installation opening facing a narrow side of the electronics housing. Guide grooves and latching elements can be provided in the installation duct. The installed grounding contact arrangement can be latched in the installation duct by means of the latching elements.

The grounding contact arrangement and the installation duct are designed such that the grounding contact arrangement can pivot about an axis that is parallel to the narrow side, and spring-loading and contact in the direction of the mounting rail are caused by a spring that can be installed in the bottom region. For this purpose, the contact part and the contact housing of the arrangement are rigidly integrally formed. Retaining elements or the like for a spring can be provided in the bottom region. The spring loads the installed grounding contact arrangement in the direction of the mounting rail. A spring of this kind can be a helical spring, a leaf spring or the like.

A retaining element for a spring can preferably be a cavity formed in the bottom region and oriented towards the mounting rail.

The electronics housing can be formed of several parts, in particular consisting of an upper part and a socket part. The bottom region can be part of a socket part of the electronics housing that can be latched onto the mounting rail. The multiple parts can be made up of: a socket part enclosing the bottom region, an upper part made up of two side parts and a cover that latches the side parts on their upper side facing away from the socket part.

Depending on the use of one of the above-mentioned springs, which are intended to facilitate spring-loading of the contact part, a spring of this type can likewise be introduced in the bottom part before the electronics housing is latched onto the mounting rail.

The grounding contact arrangement is formed of three parts. The grounding contact arrangement comprises a contact part formed as a blade contact, a contact bush that can be fastened on the contact part, and a contact housing that is formed of an insulating material and receives the contact bush. The contact part is preferably produced from a flat conductive material by means of punching and bending.

The contact part made of flat material is formed integrally with a terminal carrier. The terminal carrier is formed as a latching pin for receiving a contact terminal. The flat material comprises the blade contact at one end—the free end of the contact part—and comprises the terminal carrier at the other end that is opposite the blade contact.

The blade contact should comprise a cutting edge formed towards the mounting rail as a semi-circular contact face. The contact face of the blade contact comes to rest in the center of the longitudinal side of the electronics housing when the grounding contact arrangement is inserted.

A latching pin for receiving the contact terminal is formed at the end of the contact part facing away from the blade contact. The latching pin is arranged in a plane that is parallel to the plane in which the blade contact extends.

The contact terminal is pushed onto the latching pin such that the contact part and the contact terminal are non-detachably latched together.

The contact bush is used for introducing an electrical conductor in the form of a stranded wire or plug for making grounding contact with the mounting rail. The contact bush is enclosed by the contact housing made of insulating material.

As already mentioned, the free end of the contact part of the blade contact is preferably rigid compared with the bent terminal carrier. The spring-loading is exerted by a spring, preferably by a helical spring, introduced in the bottom region.

In an alternative embodiment, in which the contact part and the contact housing are not rigidly integrally formed, the free end of the contact part can be resilient compared with the terminal carrier. In this embodiment, the arrangement is thus a self-resilient arrangement which does not require an additional spring in the bottom part of the electronics housing. The contact part is resilient against the rigid contact housing. The grounding contact arrangement is not able to pivot in the installation duct in this case.

The electronics housing 2 shown in FIGS. 1A (and 1B) should be understood as an example of a multipart housing that can be latched onto a mounting rail 16. The type of electronics housing is not essential to the invention. What is important is that an installation duct (described hereinafter) is formed in the bottom region of the electronics housing. The electronics housing 2 consists of an upper part 4 (FIG. 1A) and a socket part 3 (FIG. 1B). The upper part can comprise a cover 5. The electronics housing can be latched on the mounting rail 16 by means of the undercuts 13.

The socket part 3 and the upper part 4 can be connected by means of a latching connection, corresponding detents being formed on the side walls 7 of the socket part 3 and latching openings corresponding to said detents being formed in the upper part 4 for this purpose. In this case, the latching between the socket part 3 and the upper part 4 is such that the socket part 3 and the upper part 4 can be interconnected without requiring tools.

The installation duct 10 comprises an installation opening 11 that faces a narrow side 6 of the electronics housing 2. The installation duct is otherwise enclosed by the housing faces, in particular by the side walls 7 of the electronics housing. Only a narrow slot which is oriented towards the mounting rail and is barely wider than the width of the blade contact is provided on the lower side as an opening. Guide grooves for introducing the grounding contact arrangement can be provided in the installation duct.

The installation duct 10 is laterally offset and is positioned near to the edge of the longitudinal side of the bottom region of the electronics housing 2. The width of said duct is approximately a third of the narrow side 6 of the electronics housing 2 (see FIG. B). Printed circuit board ducts 8 for introducing printed circuit boards are arranged in parallel with the installation duct. Therefore, at least one printed circuit board can be provided. Various connection terminals can form part of the printed circuit boards. In principle, all known types of connection terminals, i.e. in particular helical connection terminals, spring-cage terminals or leg spring terminals, can be connected to the printed circuit board in this case.

FIGS. 2A and 2B are sections through a socket part of an electronics housing that forms the bottom region.

An installation duct 10 that is accessible from the outside (in this case from the right-hand side in the drawing) via an installation opening is provided in the bottom region (or in the socket part) of the electronics housing. The installation duct 10 extends from the narrow side of the bottom region approximately to the center of the zone in which the mounting rail comes to rest.

FIG. 2A shows the arrangement without the mounting rail 16. The grounding contact arrangement 20 is tilted towards the mounting rail (not shown) as a result of the action of the spring 14 (see FIG. 2B).

The grounding contact arrangement 20 shown in FIG. 2B resiliently contacts the mounting rail 16. A cavity 12 formed as a spring chamber and oriented towards the mounting rail is provided in the bottom region. A spring 14 (helical spring) is provided in the spring chamber 12 in order to spring-load the contact part of the grounding contact arrangement. In another preferred embodiment, which is not shown schematically in this case, a leaf spring punched out either in the bottom part or on the blade contact can be provided instead of a spring chamber having a spring, which leaf spring assumes the function of the spring-loading towards the mounting rail.

The grounding contact arrangement 20 can be pivoted or tilted in the installation duct 10 by a small angle about the fixed point DP. The pivot axis extending through the fixed point DP is parallel to the narrow side 6 of the electronics housing. This mobility allows the grounding contact arrangement to follow the spring-loading by the spring 14 when the grounding contact arrangement is introduced into the electronics housing, or when the electronics housing is pushed onto the mounting rail.

Figure 4:
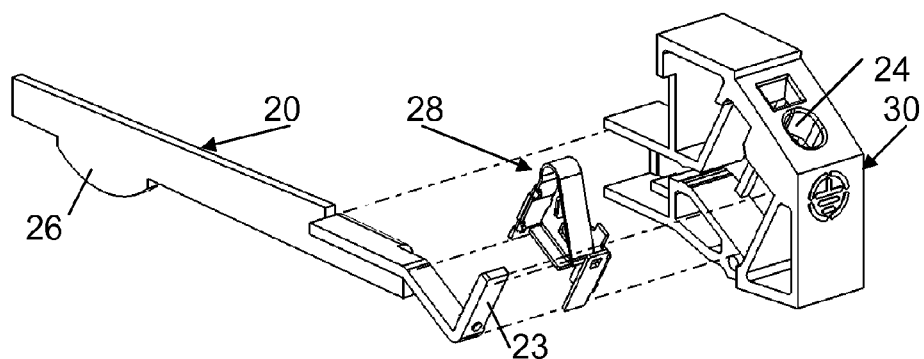
FIG. 4 is an exploded view of the grounding contact arrangement.

FIG. 3 is a side view of the grounding contact arrangement. The grounding contact arrangement 20 is made up of three parts and shown in FIG. 4 in an exploded view. The grounding contact arrangement is characterized in that it comprises a contact part 22 formed as a blade contact, a contact terminal 28 and a contact bush 24 that can be fastened on the contact part, and a contact housing 30 that is made of insulating material and receives the contact terminal 28 and the contact bush 24. The contact part 22 consists of flat conductive material which is approximately 2 to 3 mm thick and is made of conductive metal (e.g. copper or copper-alloy sheet metal).

The extension of the contact part 22 is bent downwards by a small angle 21 relative to a horizontal position in the installation duct. As a result, when loaded by the helical spring 14 located in the spring chamber 12, the grounding contact arrangement 20 can be pivoted about an axis that is parallel to the narrow side 6. The grounding contact arrangement accordingly has play in the installation duct for the pivoting movement.

The contact bush 24 is used for introducing an electrical conductor in the form of a stranded wire or plug for making grounding contact with the mounting rail. The contact bush and the contact terminal 28 are enclosed by the contact housing 30 that is made of insulating material.

At one end, the first free end, the contact part 22 consists of a blade contact 26, and at the other end, said contact part consists of a terminal carrier in the form of a latching pin 23 which is bent perpendicularly to the plane in which the blade contact lies. The blade contact 22 comprises a semi-circular cutting edge 26 formed towards the mounting rail.

The latching pin 23 for receiving the contact terminal 28 is formed on the end of the contact part remote from the blade contact 22. The contact terminal is pushed onto the latching pin such that the contact part and contact terminal are non-detachably latched together.

The free end of the blade contact 22 is rigid compared with the bent terminal carrier, which can be seen in the fact that the blade contact 22 is spring-loaded by the helical spring 13.

In contrast to the rigid grounding contact arrangement shown and described in the figures, in another embodiment of the invention the blade contact can also be resilient and pivotable relative to the contact housing 30. In this case, the contact housing is introduced into the installation duct such that it cannot pivot. A spring, which is denoted by reference numeral 14, is not necessary. The resilient movement of the contact part (blade contact) against the mounting rail is applied by the flat, conductive material of the contact part.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 2 electronics housing (made of plastics material)
3 socket part
4 upper part
5 cover
6 narrow side 7 side walls
8 printed circuit board duct
10 installation duct
11 installation opening
12 cavity (spring chamber)
13 undercut
14 spring (helical spring)
16 mounting rail
20 grounding contact arrangement
DP pivot axis fixed point
21 angle
22 contact part, blade contact (flat material)
23 latching pin (terminal carrier)
24 contact bush
26 contact face (cutting edge)
28 contact terminal (push-in terminal)
30 contact housing

The invention claimed is:

1. A system, comprising:
an electronics housing for an electromechanical switching device, the electronics housing being configured so as to be placeable on a mounting rail; and
a grounding contact arrangement, the grounding contact arrangement being configured to resiliently contact the mounting rail,
wherein the electronics housing includes
a printed circuit board duct configured for inserting one or more printed circuit boards,
connection terminals or plug-in connectors configured to connect one or more electrical conductors, the connection terminals being electrically connectable to at least one printed circuit board, and
an installation duct, present in a bottom region of the electronics housing, facing the mounting rail, the installation duct being accessible from outside a narrow side of the electronics housing, the installation duct further being formed inside the electronics housing and parallel to the printed, circuit board duct,
wherein, the grounding contact arrangement includes
a contact part formed as a blade contact,
a contact terminal which can be fastened on the contact part provided with a latching pin, and
a contact housing including insulating material, the contact housing being configured to receive the latching pin and the contact terminal,
wherein the installation duct is formed near to an edge of a longitudinal side of the bottom region of the electronics housing and
wherein the installation duct is enclosed by housing faces of the electronics housing,
wherein the grounding contact arrangement can be inserted into the installation duct irrespective of a position of the electronics housing on the mounting rail,
wherein the blade contact of the contact part is configured to come to rest on the mounting rail in a resilient manner.

2. The system of claim 1, wherein the grounding contact arrangement and the installation duct are configured such that the grounding contact arrangement can pivot about an axis that is parallel to the narrow side, and
wherein a spring that can be installed in the bottom region spring-loads the grounding contact arrangement and causes it to contact the mounting rail.

3. The system of claim 2, wherein the spring is a helical spring.

4. The system of claim 2, wherein a cavity formed as a spring chamber and oriented towards the mounting rail is provided in the bottom region.

5. The system of claim 1, wherein the contact part includes a flat, conductive material,
wherein the contact part is formed integrally with a terminal carrier that is formed as a latching pin and is designed to receive the contact terminal,
wherein the flat material includes a blade contact at a free end of the contact part, and
wherein the flat material includes the terminal carrier at a further end that is opposite the blade contact.

6. The system of claim 5, wherein the latching pin is arranged in a plane that is parallel to a plane in which the blade contact extends.

7. The system of claim 1, wherein the blade contact includes a semi-circular contact face formed towards the mounting rail.

8. The system of claim 1, wherein a free end of the contact part is resilient relative to a terminal carrier.

9. The system of claim 1, further comprising:
latching elements provided in the installation duct, such that the grounding contact arrangement can be latchably inserted into the electronics housing.

10. The system of claim 1, wherein the electronics housing includes two or more.

11. The system of claim 1, wherein a width of the installation duct is at most a third of the narrow side of the electronics housing.

12. The system of claim 2, wherein the spring is a leaf spring.

13. The system of claim 1, wherein the electronics housing includes a socket part and an upper part.

* * * * *